US006771639B1

(12) United States Patent
Holden

(10) Patent No.: US 6,771,639 B1
(45) Date of Patent: Aug. 3, 2004

(54) PROVIDING ANNOUNCEMENT INFORMATION IN REQUESTS TO ESTABLISH INTERACTIVE CALL SESSIONS

(75) Inventor: Mark J. Holden, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/546,092

(22) Filed: Apr. 10, 2000

(51) Int. Cl.[7] .............................................. H04L 12/16

(52) U.S. Cl. ....................................... 370/352; 370/260

(58) Field of Search ................................ 370/260, 261, 370/262, 263, 352, 353, 354, 355, 356, 357, 358, 264, 265

(56) References Cited

U.S. PATENT DOCUMENTS

| | | | |
|---|---|---|---|
| 5,724,412 A | | 3/1998 | Srinivasan |
| 6,240,391 B1 | * | 5/2001 | Ball et al. .................... 704/270 |
| 6,393,107 B1 | * | 5/2002 | Ball et al. ................. 379/88.13 |
| 6,446,127 B1 | * | 9/2002 | Schuster et al. ............. 709/227 |
| 6,459,774 B1 | * | 10/2002 | Ball et al. ................... 379/67.1 |
| 6,477,150 B1 | * | 11/2002 | Maggenti et al. ............ 370/312 |
| 6,577,622 B1 | * | 6/2003 | Schuster et al. ............. 370/352 |

FOREIGN PATENT DOCUMENTS

| | | |
|---|---|---|
| EP | 0 436 345 A2 | 7/1991 |
| EP | 0 641 141 A2 | 3/1995 |

OTHER PUBLICATIONS

Steve Donovan, et al., *The SIP Info Method*, Internet Draft, pp. 1–7 (Jun. 1999).
Steve Donovan, *The SIP Info Method*, Internet Draft, pp. 1–10 (Feb. 2000).

LGI Systems Inc., *A Definition of Data Warehousing*, pp. 1–2, printed from web site http://www.dwinfocenter.org, dated at least as early as Feb. 12, 2000.
Jon Crowcroft, *Comments About H.323 and SIP*, pp. 1–6, printed from web site http://www.cs.columbia.edu (Jan. 22, 1998).
*Comparison of H.323 and SIP*, pp. 1–5, printed from web site http://www.cs.columbia.edu, dated as least as early as Feb. 3, 2000.
Information Sciences Institute, *Internet Protocol, DARPA Internet Program Protocol Specification*, RFC 791, pp. 1–48 (Sep. 1981).
J. Postel, *User Datagram Protocol*, RFC 768, pp. 1–3 (Aug. 1980).
M. Handley, et al., *SDP: Session Description Protocol*, RFC 2327, pp. 1–39 (Apr. 1998).
H. Schulzrinne, et al., *RTP: A Transport Protocol for Real-Time Applications*, RFC1889, pp. 1–69 (Jan. 1996).
S. Deering, et al., *Internet Protocol, Version 6 (IPv6) Specification* , RFC 2460, pp. 1–36 (Dec. 1998).

(List continued on next page.)

*Primary Examiner*—Wellington Chin
*Assistant Examiner*—William Schultz
(74) *Attorney, Agent, or Firm*—Trop, Pruner & Hu, P.C.

(57) ABSTRACT

A communication system includes a packet-based data network and network elements coupled to the data network. The network elements are capable of participating in call sessions (e.g., Session Initiation Protocol or SIP call sessions) over the data network. A first network element can generate a call request including announcement information, with the call request targeted to one or more other network elements. The announcement information may include identification information (e.g., telephone number or web address) of the calling party and additional information that conveys to the called party some information relating to the desired call session (e.g., description of the content). Based on the announcement information, a called party may decide on disposition of the requested call.

39 Claims, 7 Drawing Sheets

OTHER PUBLICATIONS

M. Handley, et al., *SIP: Session Initiation Protocol*, RFC 2543, pp. 1–153 (Mar. 1999).

Adam Roach, *Event Notification in SIP*, Internet Draft, pp. 1–8 (Mar. 2000).

Scott Petrack, et al., *The Pint Service Protocol: Extensions to SIP and SDP for IP Access to Telephone Call Services*, Internet Draft, pp. 1–59 (Oct. 14, 1999).

Jiri Kuthan, *Sample Uses of SIP Info With Varying Reliability Needs*, Internet Draft, pp. 1–7 (Oct. 17, 1999).

Robert Sparks, et al., *SIP Telephony Service Examples With Call Flows*, Internet Draft, pp. 1–79 (Oct. 1999).

K. Krollman et al., *Display End User on Cellular Telephone (Radio)*, Motorola Technical Developments, Motorola Inc., Schaumburg, IL, vol. 38, Jun. 1999, p. 241.

* cited by examiner

```
                                                            ┌─200
         ┌  INVITE      < Request-URI >
         │  TO:         < Destination Address >
         │  FROM:       < Source Address >
         │  CALL ID:    < ID >
    202 ─┤     ⋮
         │
         │  SUBJECT:         < Text >
         │  CONTENT-TYPE:    application/multipart
         └  CONTENT-LENGTH: < Length >
                                                            ┌─207
            MIME-VERSION: 1.0
            CONTENT-TYPE: multipart/mixed; boundary=--unique-boundary-1

┌  --unique-boundary-1                             ┌─206
         │  CONTENT-TYPE: application/sdp
         │  <Blank Line>
         │  v=0
         │  o=...
         │    ⋮
         │
    204 ─┤  --unique-boundary-1                             ┌─208
         │  CONTENT-TYPE: application/wav
         │  <Blank Line>
         │    ⋮
         │
         │  --unique-boundary-1
         │  CONTENT-TYPE: application/vnd.<company>.<protocol>
         │  <Blank Line>                                    ┌─210
         └    ⋮
```

FIG. 3

PROVIDING ANNOUNCEMENT INFORMATION IN REQUESTS TO ESTABLISH INTERACTIVE CALL SESSIONS

BACKGROUND

The invention generally relates to providing announcement information in requests to establish interactive call sessions.

Packet-based data networks are widely used to link various types of network elements, such as personal computers, servers, gateways, network telephones, and so forth. Data networks may include private networks (such as local area networks or wide area networks) and public networks (such as the Internet). Popular forms of communications between network elements across packet-based data networks include electronic mail, file transfer, web browsing, and other exchanges of digital data.

With the increased capacity and reliability of packet-based data networks, voice communications (including telephone calls, video conferencing, and so forth) over data networks have become possible. Voice communications over data networks are unlike voice communications in a conventional public-switched telephone network (PSTN), which provides users with dedicated, end-to-end circuit connections for the duration of each call. Communications over data networks, such as IP (Internet Protocol) networks, are performed using packets or datagrams that are sent in bursts from a source to one or more destination nodes. Voice data sent over a data network typically shares network bandwidth with conventional non-voice data (e.g., data associated with electronic mail, file transfer, web access, and other traffic).

Various standards have been proposed for voice and multimedia communications over data networks. One such standard is the H.323 Recommendation from the International Telecommunications Union (ITU), which describes terminals, equipment, and services for multimedia communications over data networks.

Another standard for voice and multimedia communications is the Session Initiation Protocol (SIP), which establishes, maintains, and terminates multimedia sessions over a data network. SIP is part of a multimedia data and control architecture developed by the Internet Engineering Task Force (IETF). The IETF multimedia data and control architecture also includes other protocols to enable voice and multimedia sessions over data networks, including the Resource Reservation Protocol (RSVP) for reserving network resources; the Real-Time Transport Protocol (RTP) for transporting real-time data and providing quality of service (QoS) feedback; the Real-Time Streaming Protocol (RTSP) for controlling delivery of streaming media; the Session Announcement Protocol (SAP) for advertising multimedia sessions by multicast; and the Session Description Protocol (SDP) for describing multimedia sessions.

In telephony communications (both over data networks as well as over conventional circuit-switched networks such as the PSTN), some indication is typically provided with a call to identify the calling party. In a PSTN system, such an indication can be a caller identifier (ID), typically in the form of a telephone number, that appears on the telephone display. In some telephony systems, such as in private branch exchange (PBX) systems, key exchange systems, and centrex systems, the name of the calling party can also be displayed in addition to or instead of the telephone number. Similar information (originating telephone number and name or address of calling party) can also be displayed at the destination terminal in a call session over packet-based data networks.

Such identification information associated with the calling party can be used by a called party to screen calls. Thus, for example, if a called party is busy and an incoming call is received, the called party can elect not to answer calls from persons outside a select group. However, although the calling party can be identified using such identification information, further information is typically not provided. This limits information available to a called party on how to dispose of an incoming call.

SUMMARY

In general, according to one embodiment, a method of establishing a call session in a data network includes receiving, at a device, a call request to establish an interactive call session. The call request includes announcement information including identification information of the calling entity and additional information describing the requested call session. The announcement information is presented on the device to influence a called party on disposition of the call request.

Some embodiments of the invention may include one or more of the following advantages. By providing additional information to describe the desired call session, a description of contents of the call session in addition to identification of the calling party may be provided to the called party. This provides the called party with additional information on which a decision can be made regarding whether or not to take the call. Thus, a calling party can convey a desired message to the called party with the call request, rather then waiting for the call to be forwarded to a voice message system and waiting for the called party to retrieve the message at a later time. One benefit offered to the called party is that the called party can make a decision to pick up an urgent call if necessary. A benefit offered the calling party is that a mechanism is provided to notify the called party of the urgency of a call. In addition, the announcement information can itself be used as the primary mechanism for communication.

Other features and advantages will become apparent from the following description, from the drawings, and from the claims.

BRIEF DESCRIPTION OF THE DRAWINGS

FIG. 3 illustrates a message according to a Session Initiation Protocol (SIP) in accordance with one embodiment, the SIP message including announcement information.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the Session Initiation Protocol (SIP) in the described embodiments, other protocols for establishing interactive, real-time communications may be employed in further embodiments.

Figure 1:
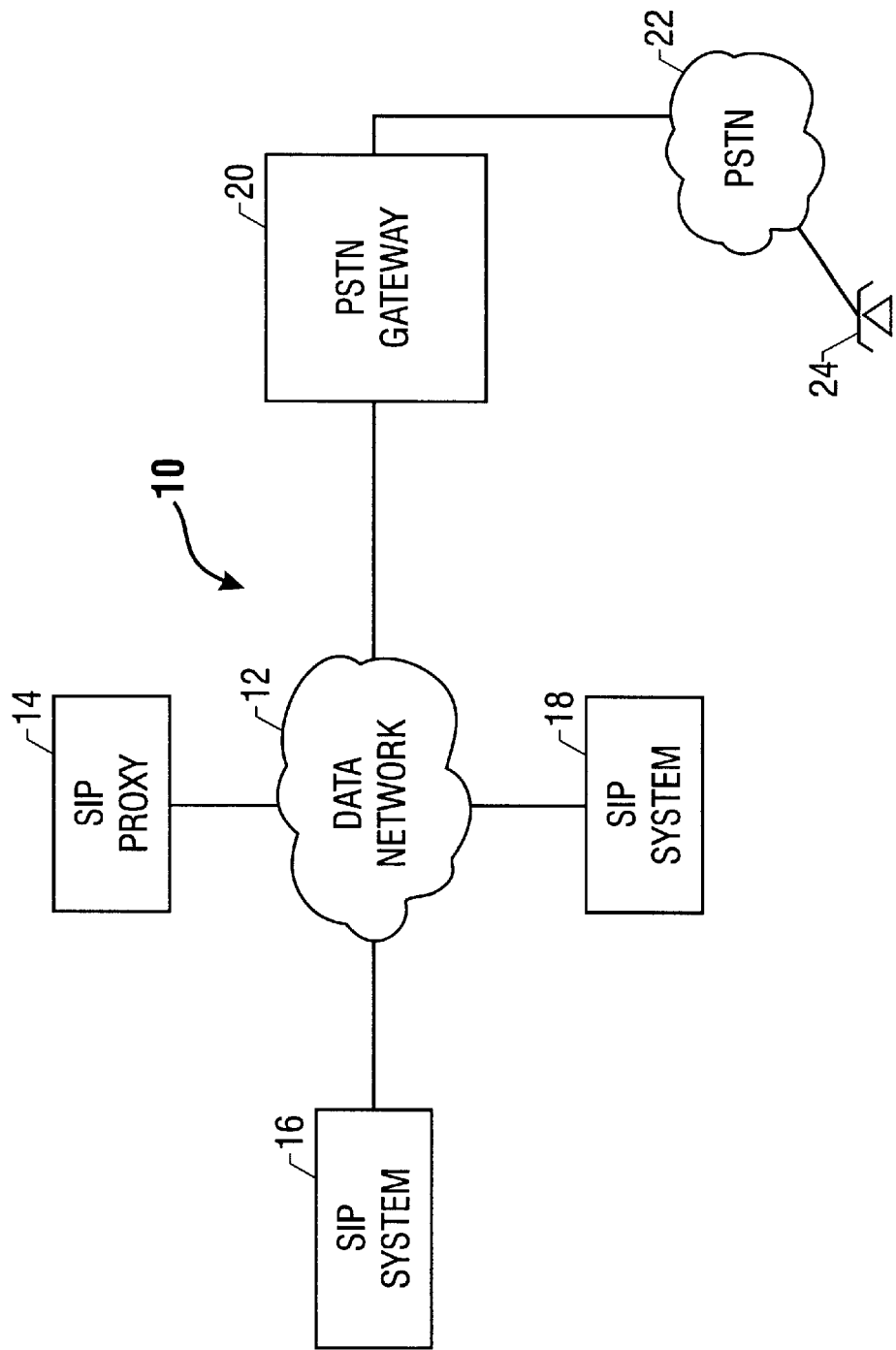
FIG. 1 is a block diagram of an embodiment of a communications system including a packet-based data network.

Referring to FIG. 1, a communications system 10 includes a data network 12 that may be coupled to various systems 14, 16, 18 and 20. The data network 12 may be a packet-switched data network, such as a data network according to the Internet Protocol (IP). Examples of the data network 12 include local area networks (LANs), wide area networks (WANs), and the Internet.

One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 12 may also include other types of packet-based data networks in further embodiments. Examples of such other packet-based data networks include Asynchronous Transfer Mode (ATM) and Frame Relay networks.

As used here, a "data network" may refer to one or more communications networks, channels, links, or paths, and systems or devices (such as routers) used to route data over such networks, channels, links, or paths. Packet-switched data networks such as IP networks communicate with packets, datagrams, or other units of data over the data networks. Unlike circuit-switched networks, which provide a dedicated end-to-end connection or physical path for the duration of a call session, a packet-switched network is one in which the same path may be shared-by several network elements.

Packet-switched networks such as IP networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet. Packet-based networks may also be connection-oriented networks, such as ATM and Frame Relay networks. In a connection-oriented packet-based network, a virtual circuit or connection is established between two end points. In such connection-oriented networks, packets are received in the same order in which they were transmitted.

The systems 14, 16, 18, and 20 may communicate over the data network 12 according to a Session Initiation Protocol (SIP). SIP is part of the multimedia data and control architecture from the Internet Engineering Task Force (IETF). A version of SIP is described in RFC 2543, entitled "SIP: Session Initiation Protocol," dated August 1999. SIP may be used to initiate call sessions as well as to invite members to a session that may have been advertised by some other mechanism, such as electronic mail, newsgroups, web pages, and other mechanisms. The other protocols in the IETF multimedia and control architecture include the Resource Reservation Protocol (RSVP), as described in RFC 2205; the Real-Time Transport Protocol (RTP), as described in RFC 1889; the Real-Time Streaming Protocol (RTSP), as described in RFC 2326; the Session Description Protocol (SDP), as described in RFC 2327; and the Session Announcement Protocol (SAP).

Other standards may be employed in further embodiments for controlling call sessions over the data network 12. Such other standards may be any other standard that provides for interactive, real-time voice or multimedia communications over the data network 12. One alternate standard is the H.323 Recommendation from the International Telecommunications Union (ITU).

As used here, a "call session" refers generally to either a voice, video, or a multimedia session established between two or more network elements (and parties using those elements) coupled to the data network 12 (or any other packet-based data network). As used here, an "interactive" call session refers to a call session in which two or more parties are involved in an exchange of voice and/or video data in an established session between two or more network elements. A "real-time" interactive call session refers to an exchange of data, such as audio and/or video data, on a substantially real-time basis between two terminals. A session is substantially real time if interaction is occurring between two end points or parties, with a communication from one end point followed relatively quickly by a response or another communication from the other end point, typically within seconds, for example.

Interactive can sessions are contrasted with electronic mail messaging, for example, in which a first participant sends a message over a data network to a second participant. No indication is usually provided back to the first participant that the second participant has received the message or that the second participant is even at his or her terminal. In contrast, an interactive session involves a request followed by some acknowledgment that a called party has accepted the call request. This enables the interactive session in which participants exchange data (e.g., voice, video, and/or text).

As shown in FIG. 1, the systems 16 and 18 are referred to as SIP systems, which may be SIP clients or SIP servers. A SIP client system includes client application programs that are capable of sending SIP requests to perform call requests. A SIP server system includes application programs that accept SIP requests to service calls and to send back responses to SIP requests. Thus, the systems 16 and 18 may be SIP client systems some of the time and SIP server systems other times. The system 14 may be a SIP proxy system, which may include an intermediary program that acts as both a server and a client for making requests on behalf of other clients. Thus, for example, the SIP system 16 may make a call request to the SIP system 18 directly through the data network 12. Alternatively, the system 16 may go through the SIP proxy system 14 to make the call to the SIP system 18.

A PSTN gateway 20 provides a gateway between the data network 12 and a public-switched telephone network (PSTN) 22, which is coupled to circuit-switched telephone systems. The PSTN gateway 20 may also include elements to enable it to participate in SIP call sessions over the data network 12. A caller at a telephone system 24 may place a circuit-switched call through the PSTN 22 to the PSTN gateway 20. The PSTN gateway 20 then converts the call into a SIP call request that is sent to one of the systems 16 and 18 to establish a call session between the telephone system 24 and the SIP system. The reverse process may also be performed in which a SIP system initiates a call through the PSTN gateway 20 to one of the telephone systems 24.

In accordance with some embodiments, in call sessions over the data network 12, call requests between network elements may include announcement information. Such call requests may also be referred to generally as invitations to participate in the desired session. The announcement information may include identification information of the calling system or calling party as well as additional information relating to or describing the desired call session. In this discussion, the identification information of the calling system or the calling party may be generally referred to as the identification information of the calling "entity." By way of example, the identification information may include the telephone number or an address (e.g., electronic mail address or uniform resource locator) of the calling entity. The additional information in the announcement information describing the desired call session may, by way of example, include audio, video, text, and/or other types of information that may be presented at the terminal (or a device coupled to the terminal) of the called party. In some embodiments, the announcement information includes simple text data. In other embodiments, the announcement information includes a "richer" type of data, such as audio data, video data, multimedia data, and data of other formats. As used here, such "richer" types of data may be referred to as "media data." Thus, "media data" may be any one or some combination of the following types of data: audio data, video data, image data, markup data (e.g., HTML or XML), and others. Media data may include text data in conjunction with other related data (e.g., font, size, color, or other indicators).

The additional information included in the announcement information is information to convey to the called party a description of the content of the desired call session. The terminal or other device on which the announcement information is to the presented is referred to as a "presentation device." In this description, the destination or called party and/or terminal may be generally referred to as the destination or called "entity."

The additional information (or announcement information) is intended to influence the called party in the disposition of the call request. For example, the announcement information may indicate the urgency or the content of the desired call session. Based on the announcement information, the called party may decide to answer the call, ignore the call, or forward the call to another entity. Also, the session description information may itself be the primary communications mechanism. For example, a calling party may use the mechanism to make a general announcement (e.g., "meeting in ten minutes," "lunch at 11:30," and so forth). The intent of such a general announcement is that the called party or parties not answer the call. However, flexibility is provided since a called party may decide to answer the call, such as to inform the calling party that he or she is unable to make the meeting or lunch appointment.

The announcement information may be either embedded in the call request or retrieved from a remote location by the called entity. The call request may include at least a header portion and a body portion. The announcement information according to some embodiments may be contained in the body portion. If data is embedded, then the data (which may be a file, for example) may be part of, attached to, or otherwise associated with the call request. If data is retrieved remotely, then an indication may be provided in the call request concerning the remote location of the data. Even though announcement information may be retrieved remotely, it is still said to be "contained" or "included" in the call request (or another message).

Figure 2:
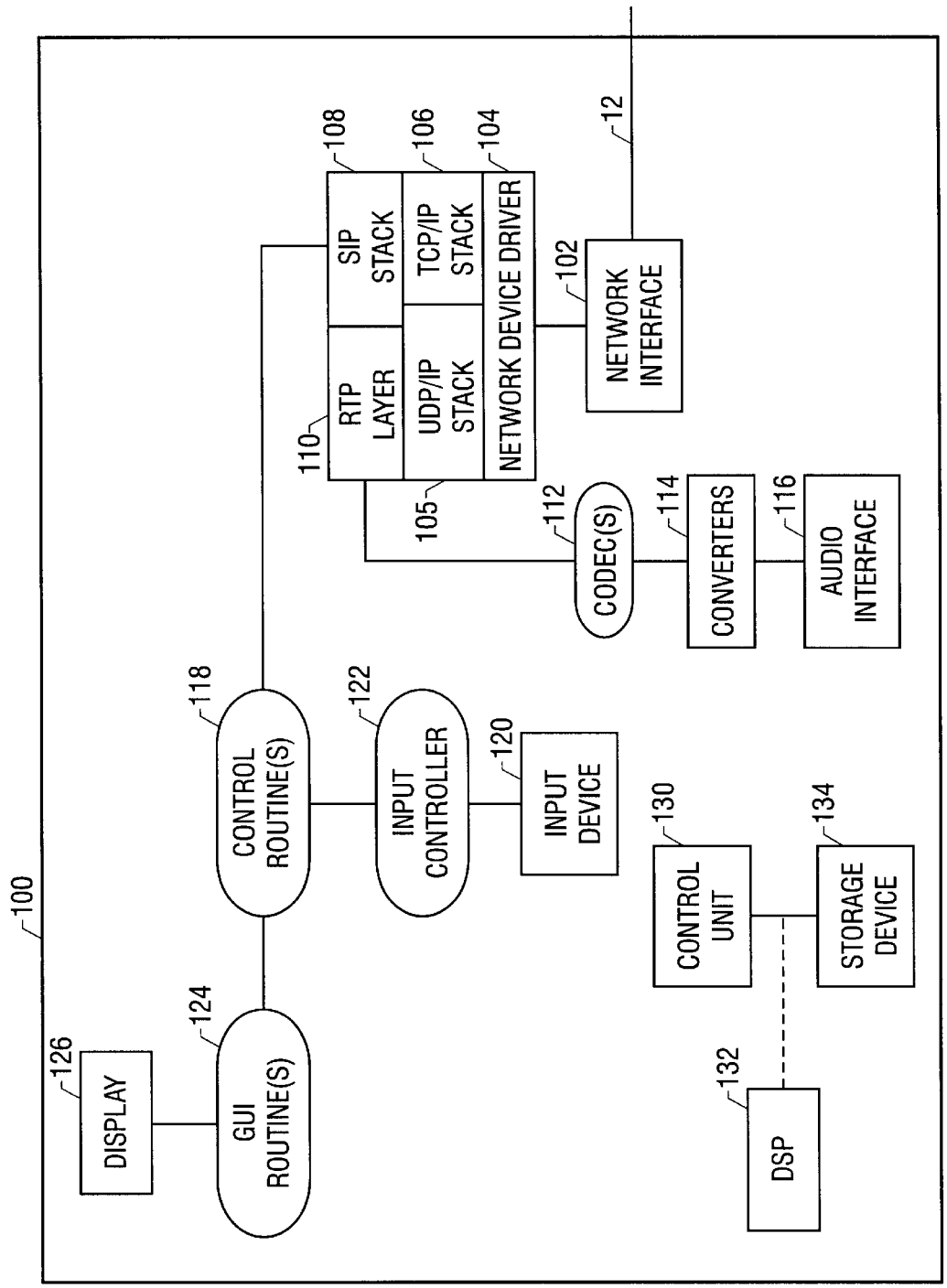
FIG. 2 is a block diagram of a network element in accordance with an example embodiment for use with the data network of FIG. 1.

Referring to FIG. 2, the components of an example network element 100 (such as system 14, 16, 18 or 20) are illustrated. The network element 100 includes a network interface 102 that is coupled to the data network 12. The data network interface may include a network controller card or chip, as examples. Above the network interface 102 are a network device driver 104 and transport and network stacks 105 and 106 (e.g., a TCP/IP stack 106 and a UDP/IP stack 105). TCP is described in RFC 793, entitled "Transmission Control Protocol," dated September 1981; and UDP is described in RFC 768, entitled "User Datagram Protocol," dated August 1980. TCP and UDP are transport layers for managing connections between network elements over an IP network. Above the transport and network stacks are a SIP stack 108 that parses and processes SIP messages (both inbound and outbound). The UDP/IP stack 105 also is connected to a Real-Time Protocol (RTP) layer 110 that processes and generates real-time data (such as data associated with an audio and/or video call). The RTP layer 110 may be connected to a coder/decoder (CODEC) 112, which is coupled through converters 114 (e.g., analog-to-digital and digital-to-analog converters). The converters 114 are coupled to an audio interface 116 that may in turn be coupled to a speaker, headphone, and/or microphone (not shown) for presenting and receiving audio signals. The RTP layer 110 is also associated with a Real-Time Control Protocol (RTCP) layer for carrying control information.

The network element 100 may also include one or more control routines 118 that are coupled to receive control signaling from the SIP stack 108 or to provide control signaling to the SIP stack 108 for generation SIP messages. The control routines 118 can make decisions on how to process the received SIP messages and how to respond to such SIP messages received through the SIP stack 108. For example, such SIP messages may be messages inviting the network element 100 to participate in a call session as well as various response messages indicating various stages of the progress of a call session setup. The control routines 118 may receive input from the user at an input device 120, which are communicated to the control routines 118 through an input controller 122. Based on the user input, the control routines 118 may send request or response messages through the SIP stack 108 to the data network 12 indicating initiation of a call, acceptance of a call request, or forwarding of the call to another device. The control routines 118 are also coupled to graphical user interface (GUI) routines 124 that are coupled to a display 126. The GUI routines 124 can provide status indicators to a user as well as selectors for receiving user input on the display 126.

Referring to FIG. 3, a SIP message 200 that may be employed in communications over the data network 12 between the various network elements includes announcement information in accordance with one embodiment. The illustrated SIP message 200 includes portions of an Invite request. The horizontal lines shown in FIG. 3 are blank lines used in a SIP message to specify message boundaries. Horizontal lines are illustrated for clarity purposes. The SIP message 200 includes a header portion 202 having several fields. A first line of the header portion 202 includes the field "Invite" to indicate that the message 200 is an Invite request. Following that, the destination address, source address, and identification (Call-ID) of the call session may be provided. The header portion 202 may also include a subject field that contains subject text. The content type and content length may also be included in the header portion 202. The content type may indicate a multipart message including plural message body sections. A section 207 includes another Content-Type field that is set to the value "mulitpart/mixed" to indicate that a message body 204 of the message has mixed data types. The boundary between different sections in the message body may be "—unique-boundary-1" in one example. Other types of boundaries may be specified in other embodiments.

The message body 204 of the message 200 may include several sections (a multipart message). A first section 206 may include the standard description of the SIP message under the header "Application/SDP" (indicating that the section 206 includes SDP data with a description of the requested call session). The other sections 208 and 210 may include announcement information that are to be presented to the called entity. The sections 208 and 210 are according to data either directly embedded in the message or accessed remotely from the network and subsequently presented to the use. Either data can include standard formats of data such as WAV audio files, MPEG video files, and so forth. For example, the section 208 includes WAV audio data (which may be embedded in the message 200).

The data can also include vendor-specific or data types according to other protocols. In the example of FIG. 3, the section 210 includes a vendor-specific data type specified as vnd.<company>.<protocol>, which specifies a vendor-specific application type used to access announcement information over a network connection. Although only two sections of announcement information are shown in FIG. 3, other embodiments of the message 200 may include only one such section or more than two sections. The terms "announcement information" and "cover media" are interchangeably used in this description.

Figure 4:
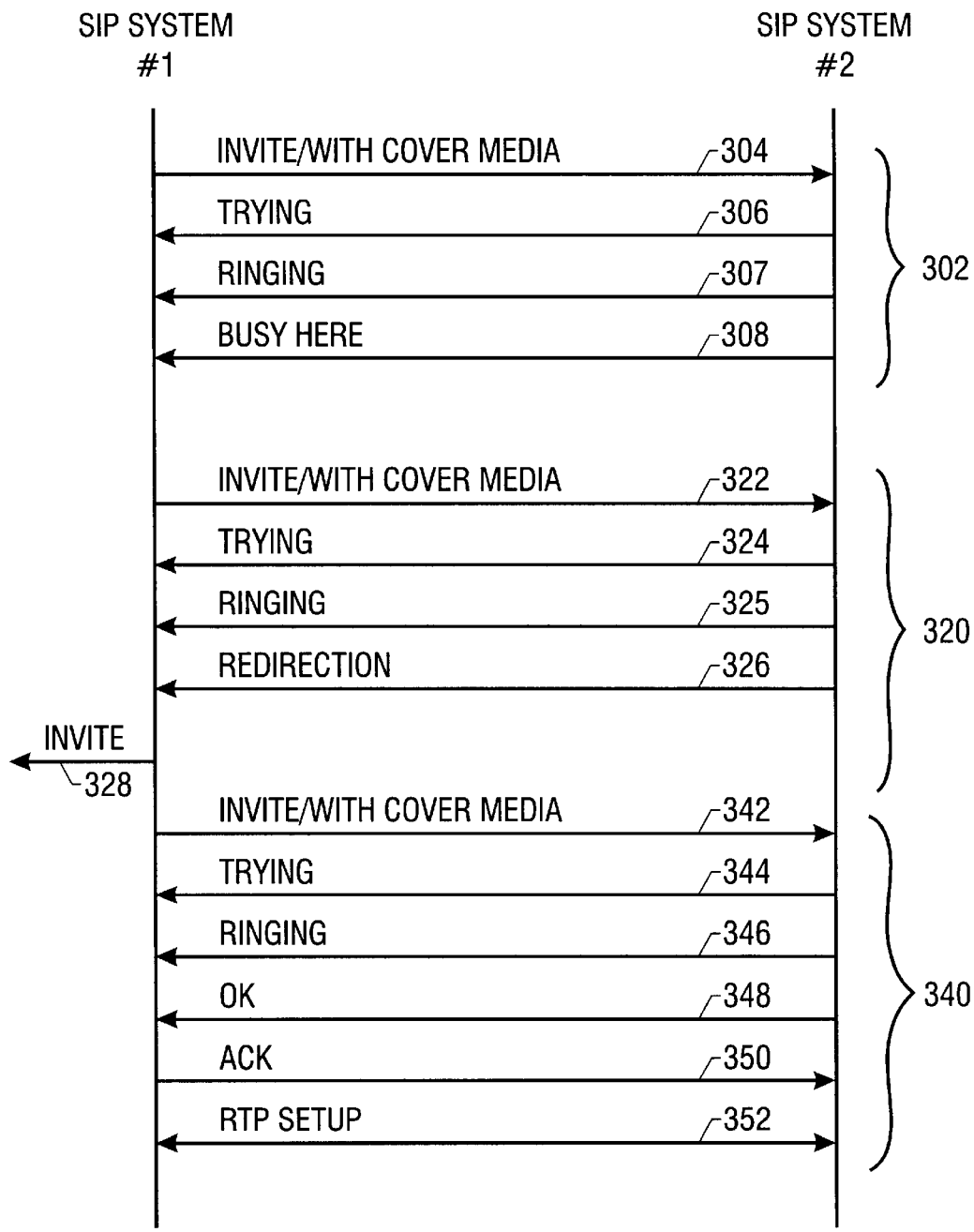
FIG. 4 is a message flow diagram illustrating three different flows in accordance with some embodiments.

Referring to FIG. 4, three example call flows 302, 320, and 340 are illustrated. The first call flow 302 starts with an Invite request that includes announcement information. The Invite request is sent (at 304) from a first SIP system to a second SIP system. Next, the second SIP system returns a Trying response (at 306) back to the first SIP system. A Ringing response may later be sent (at 307) by the second SIP system back to the first SIP system to indicate that a user agent in the called terminal has located a possible location the called party has registered at and is trying to alert the called party. Based on the announcement information, the user at the second SIP system may decide to answer or not to answer the call (thus electing to let the call ring through to voice mail or to hit a button or other selector indicating that the user is busy). In either case, the SIP system may send back a Busy Here response (at 308) to the first SIP system. The Busy Here response indicates that the called system was contacted successfully but that the called party is currently not willing or able to take additional calls. The response may indicate back to the called party a better time to call.

In the second example call flow 320, the first SIP system sends the Invite request (at 322) to the second SIP system, with the Invite request including announcement information. The second SIP system responds (at 324) with the Trying response. Later, the second SIP system may send a Ringing response (at 325). In the call flow 320, the called party may decide to redirect the call to another device based on the received announcement information. The called party may do this by pressing predetermined buttons or other selectors (such as in a GUI display) on the called terminal. As a result, the second SIP system may send a Redirection response that includes information about the new location back to the first SIP system. The new location may be associated with the called party's assistant, for example, who can handle the call on behalf of the called party. Alternatively, the new location may also be the called party's voice mail. In response to the Redirection response, the first SIP system may send an Invite request (at 328) to the alternative location.

In the third example call flow 340, the first SIP system sends an Invite request (at 342) including announcement information to the second SIP system. The second SIP system sends (at 344) the Trying response back to the first SIP system. Next, the second SIP system may send (at 346) a Ringing response back to the send SIP system. Based on the announcement information, the called party may decide to accept the call, at which point the second SIP system sends (at 348) an OK response back to the first SIP system. In response, the first SIP system sends (at 350) an Ack request back to the second SIP system. At this point, an RTP setup exchange may be performed (at 352) to establish the voice and/or video session between the first and second SIP systems.

Figure 5:
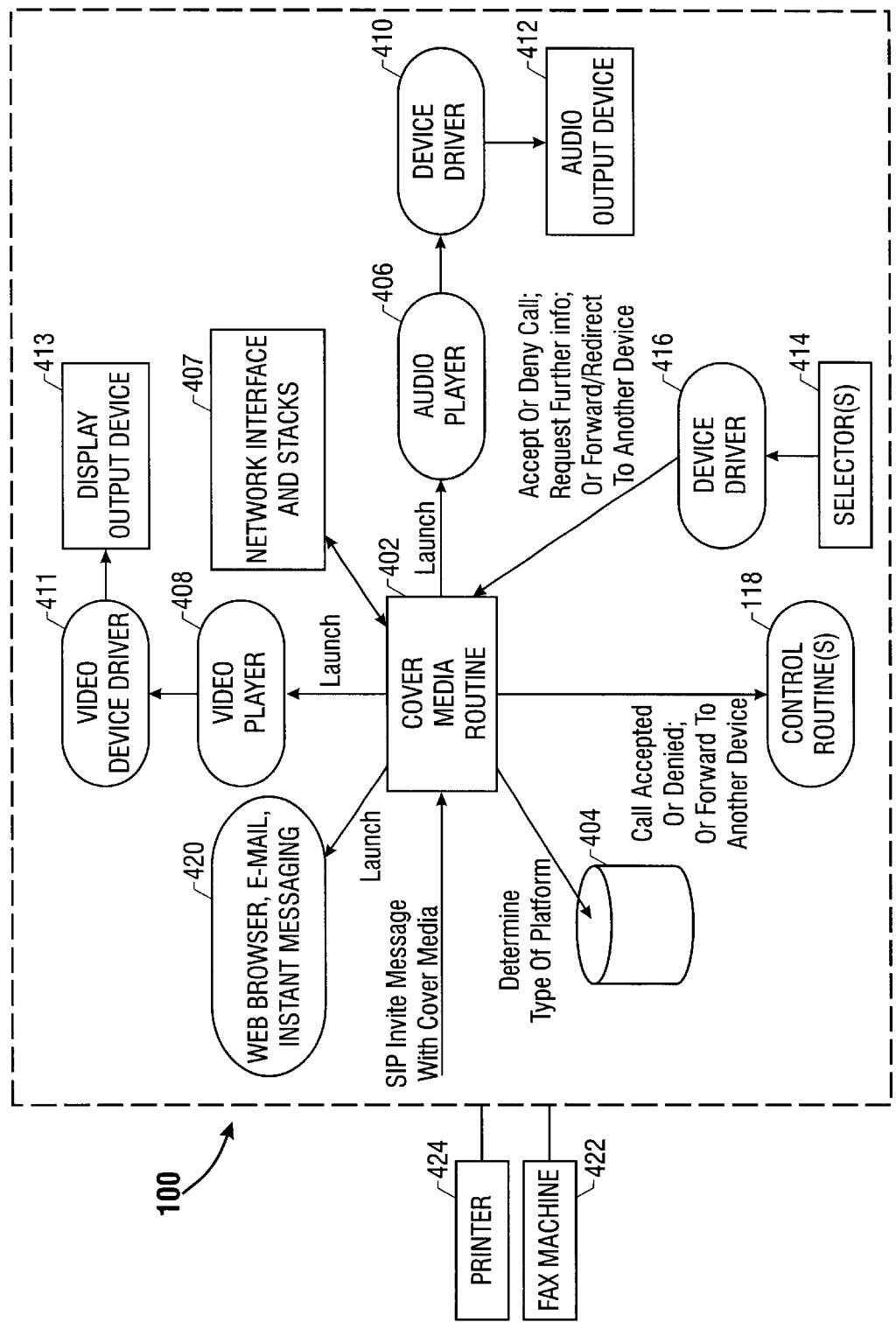
FIG. 5 illustrates components (software and hardware) in the network element of FIG. 2 and the exchange of communications between such components in response to receipt of announcement information in accordance with one embodiment.
Figure 6:
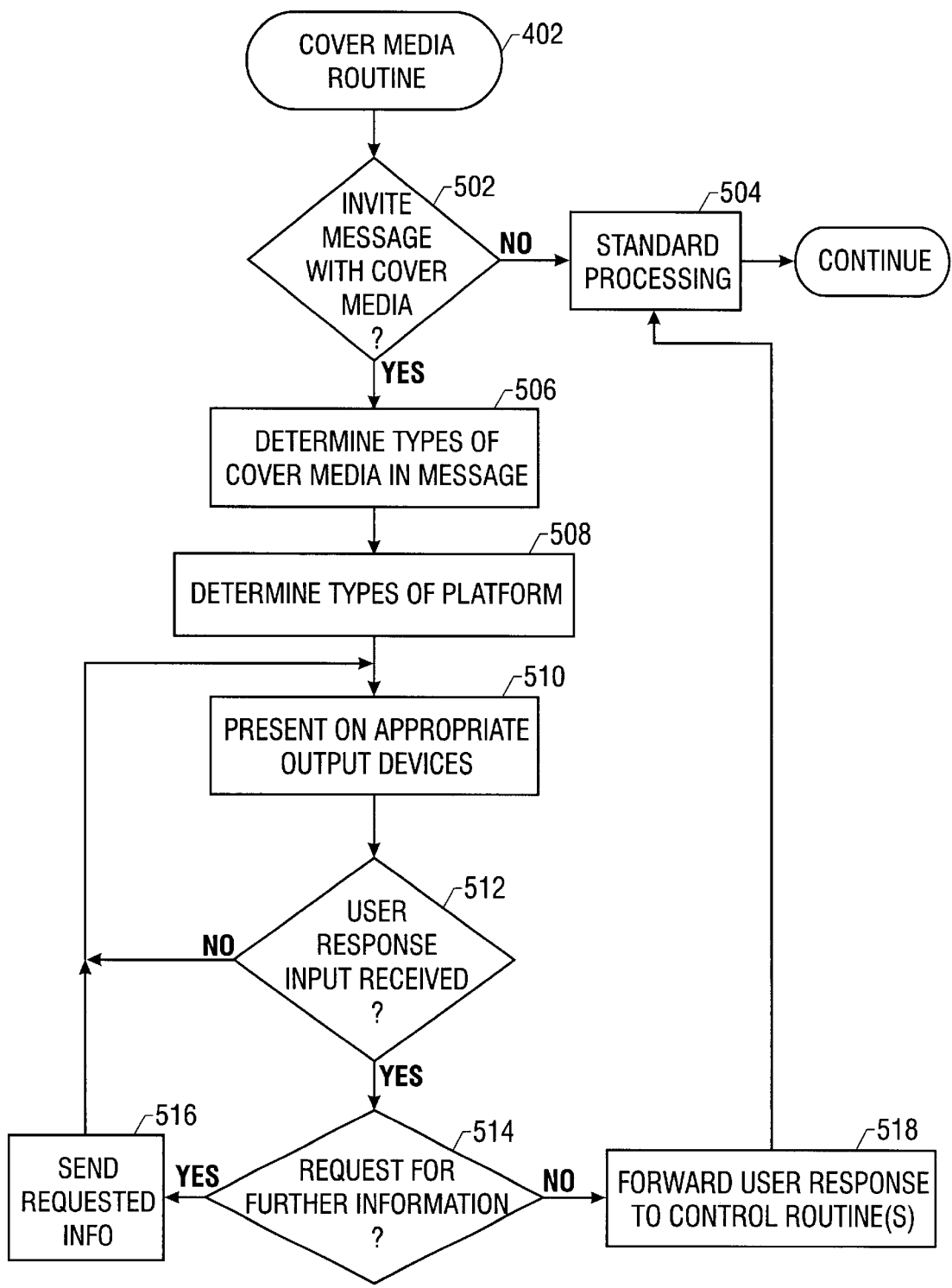
FIG. 6 is a flow diagram of a process performed by a cover media routine in the system of FIG. 5 in accordance with one embodiment.

Referring to FIGS. 5 and 6, an example process performed by a network element 100 in response to a SIP Invite message containing announcement information is illustrated. A cover media routine 402 in the network element 100 receives the SIP Invite message with the announcement information. As shown in FIG. 6, the cover media routine 402 determines (at 502) whether such an Invite message has been received. If the Invite message does not include announcement information, the cover media routine 402 sends the message on for standard SIP processing (at 504). If the Invite message includes announcement information, then the cover media routine 402 determines (at 506) the types of cover media included in the message. For example, the types may include audio and video data or other types. The cover media may also be embedded in the Invite message or it may be retrieved from a remote location. If the cover media is located remotely, then the cover media routine 402 can retrieve the cover media from the remote location through the network interface and stacks (represented as 407 in FIG. 5).

Next, the cover media routine 402 determines (at 508) the type of platform that the network element 100 is implemented on. The network element 100 may be a network telephone with a limited display screen. If so, graphical information may not be presentable on the display screen, although text information may be. To determine the type of platform, the cover media routine 402 may access one or more locations in a storage device 404 (FIG. 5).

The cover media routine then presents (at 510) the cover media on the appropriate output devices. To present the announcement information, the cover media routine 402 may launch an appropriate application routine. For example, the application routine may include an audio player routine 406 (FIG. 5) to present audio data. To present video data, the cover media routine 402 may launch a video player routine 408. The audio player routine 406 sends the audio data through an audio device driver 410 to an audio output device 412. The video player routine 408 sends the video data through a video device driver 411 to a display output device 413. The display output device 413 may include a video controller and a display coupled to the video controller.

The launched application may also include a web browser, electronic mail application, or instant messaging application 420. The announcement information may thus be in Hypertext Markup Language (HTML) or Extensible Markup Language (XML) format to enable display in a browser window associated with the web browser 420. Alternatively, the announcement may be in electronic mail format or in instant messaging format. In addition, different combinations of the various formats of the announcement information may be presented.

Yet other applications may be launched to send the announcement data to a fax machine 422, a printer 424, or other device externally coupled (through a port or over a network) to the network element 100.

As shown in FIG. 6, the cover media routine waits (at 512) for a user response. As shown in FIG. 5, the user response may come from one or more selectors 414 (in the form of buttons or selectors presented in a GUI display). Selections made by the user with the selectors 414 are communicated through a device driver 416 back to the cover media routine 402. One of the selections may be a request for further information. Thus, if the cover media routine 402 receives a request for such further information (at 514), it may send the requested further information (at 516) either to the display output device 413 or the audio output device 412 (FIG. 5).

Other selections that can be made by the user include acceptance of the call, rejection of the call, or forwarding or redirection of the call to another device. The user can also elect not to perform any action (which is construed to be a rejection of the call). Upon receipt of such selections, the cover media routine 402 forwards (at 518) the user response to the control routines 118 (FIG. 5).

Figure 7:
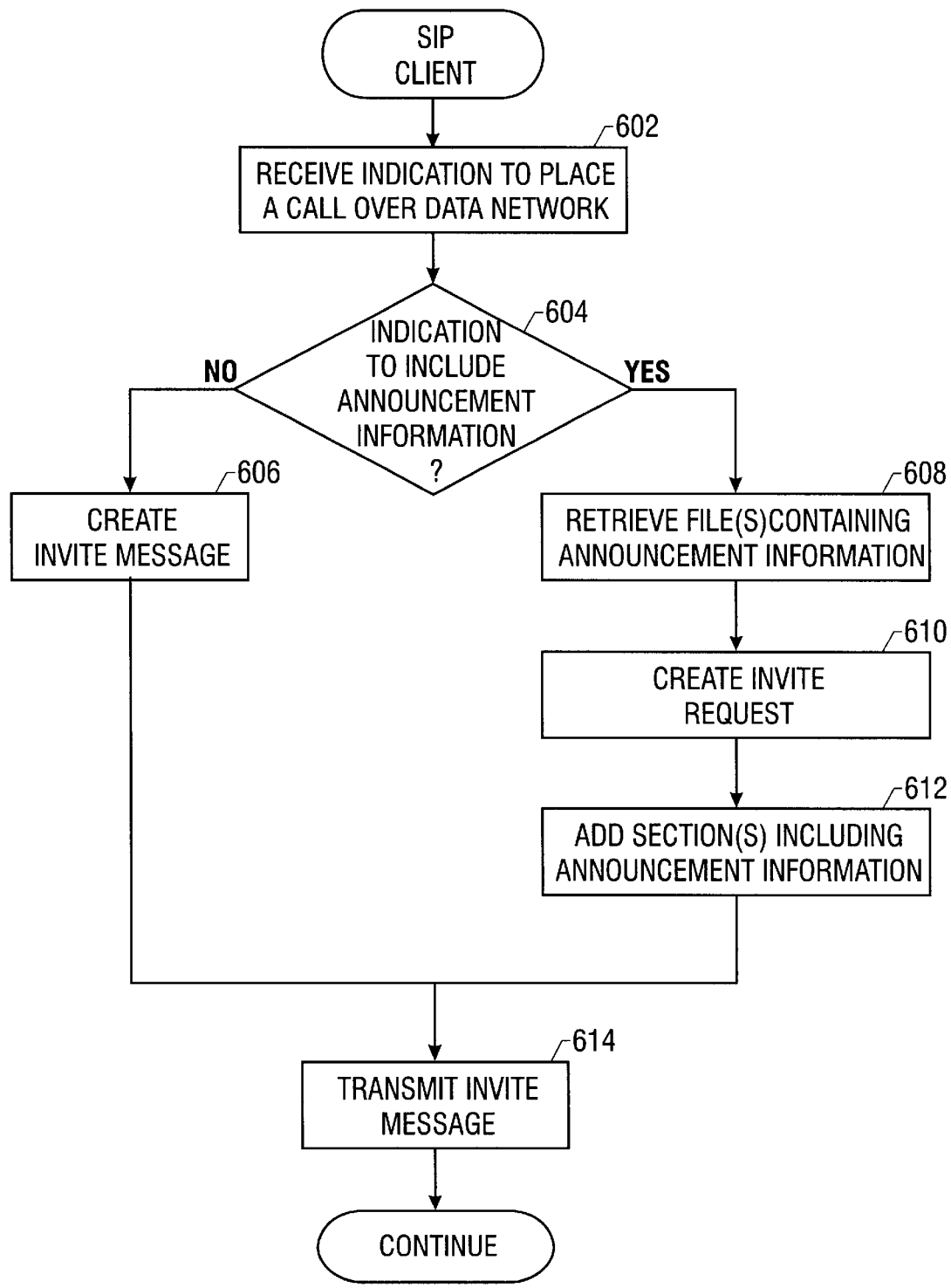
FIG. 7 is a flow diagram of a process performed by a routine executed in a system to generate and transmit a call request containing announcement information in accordance with one embodiment.

Referring to FIG. 7, the process performed by a SIP client application (such as one running in the system 100 of FIG. 2) is shown. After receiving (at 602) an indication to place a call over the data network, the SIP client determines (at 604) if an indication has been received that announcement information is to be included in the call request. If not, then a standard Invite request is created (at 606).

However, if announcement information is to be included in the call request, the SIP client application proceeds to retrieve (at 608) the one or more files containing the announcement information. Such files may include audio files (e.g., .WAV format), video files (e.g., JPEG or MPEG format), text files, web page files (e.g., HTML or XML format), image files (e.g., bit maps), and other types of files.

The SIP client application then creates an Invite request (at 610), adding (at 612) the one or more sections including announcement information from the retrieved one or more files into the Invite request. As noted above, the announcement may be embedded in the Invite request or an indication may be included in the Invite request that the announcement information is located remotely. The Invite request is then transmitted (at 614), followed by further exchanges of SIP messaging to establish the call session.

The various software layers, routines, or modules described herein may be executable on various processing elements as shown in FIG. 2, such a control unit 130 and an optional digital signal processor (DSP) 132. The control unit 130 and DSP 132 are coupled to a storage device 134. The control unit 130 may include a microprocessor, a microcontroller, a processor card (including one or more microprocessors or microcontrollers), or other control or computing devices. As used here, a "controller" can refer to either hardware or software or a combination of the two.

The storage device 134 may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines or modules in the various network elements may be stored in respective storage devices. The instructions when executed by a respective control unit (or DSP) cause the corresponding network element to perform programmed acts.

The instructions of the software layers, routines, or modules may be transported to the network element in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of establishing a call session in a data network, comprising:

receiving, at a device, a call request to establish an interactive call session, the call request including announcement information having identification information of the calling entity and additional information describing the requested call session, the additional information including media data;

presenting at least the additional information on the device to influence a called party on disposition of the call request; and determining a type of the additional information and launching a corresponding application to process the information.

2. The method of claim 1, wherein receiving the announcement information includes receiving additional information having audio data.

3. The method of claim 1, wherein receiving the announcement information includes receiving additional information having video data.

4. The method of claim 1, wherein receiving the announcement information includes receiving additional information having electronic mail data.

5. The method of claim 1, wherein receiving the announcement information includes receiving additional information having web page data.

6. The method of claim 5, wherein receiving the announcement information includes receiving additional information having an embedded hypertext markup language web page.

7. The method of claim 1, wherein receiving the announcement information includes receiving additional information having fax data.

8. The method of claim 1, wherein receiving the announcement information includes receiving announcement information having audio and video portions.

9. The method of claim 8, wherein presenting the announcement information includes presenting one or more of the audio and video portions depending on presentation capabilities of the device.

10. The method of claim 9, further comprising determining presentation capabilities of the device to determine if one or both of the audio and video portions can be presented.

11. The method of claim 1, wherein receiving the call request includes receiving a message having one or more predetermined portions to store the additional information.

12. The method of claim 11, wherein the message includes portions according to one or more of formats selected from the group consisting of a Session Description Protocol, an audio format, a video format, a web page format, and an electronic mail format.

13. The method of claim 1, wherein receiving the call request includes receiving a call request to establish a real-time, interactive call session between the calling entity and the called party.

14. The method of claim 1, wherein launching the application includes launching an audio player application.

15. The method of claim 1, wherein launching the application includes launching a video player application.

16. The method of claim 1, wherein presenting the additional information on the device comprises displaying one or more images of a calling party.

17. An apparatus for use in a data network, comprising:
an interface to receive an invitation wherein the invitation includes a Session Initiation Protocol Invite message, over the data network to establish an interactive call session, the invitation including announcement information relating to content of a desired interactive call session; and
a controller to process the invitation and present the announcement information before the interactive call session is established, the invitation including a header portion and a body portion, at least a part of the announcement information being contained in the body portion.

18. The apparatus of claim 17, wherein the announcement information includes identification information of the calling entity and additional information relating to content of the desired interactive call session.

19. The apparatus of claim 17, wherein the announcement information includes at least one of audio data, video data, and text data.

20. The apparatus of claim 19, wherein the audio data includes a voice message.

21. The apparatus of claim 19, wherein the video data includes one or more video images of a calling party.

22. The apparatus of claim 17, wherein the controller is adapted to launch a routine to present the announcement information.

23. The apparatus of claim 22, wherein the routine is selected from the group consisting of a video player, an audio player, a web browser, an electronic mail application, and an instant messaging application.

24. The apparatus of claim 17, wherein the controller is adapted to send the announcement information to a presentation device.

25. The apparatus of claim 24, wherein the presentation device is selected from the group consisting of a fax machine, a printer, a speaker, and a monitor.

26. The apparatus of claim 17, wherein the invitation includes one or more portions containing the announcement information.

27. The apparatus of claim 17, wherein the announcement information is embedded in the invitation.

28. The apparatus of claim 17, wherein the invitation includes an indication to retrieve the announcement information from a remote location.

29. The apparatus of claim 17, further comprising an output device, the controller to present the announcement information on the output device.

30. The apparatus of claim 29, wherein the output device comprises a display.

31. The apparatus of claim 29, wherein the output device comprises an audio output device.

32. The apparatus of claim 17, wherein the announcement information includes one or more images of a calling party.

33. A data signal embodied in a carrier wave and containing one or more code segments including instructions for call control, the instructions when executed causing a system to:
receive a call request wherein the call request includes a Session Initiation Protocol Invite message, containing announcement information relating to content of a requested interactive call session, the request containing a header portion and a body portion, at least a part of the announcement information being contained in the body portion; and
present the announcement information on an output device of the system to influence a called party on disposition of the requested interactive call session.

34. The data signal of claim 33, wherein the call request further includes an identifier of a calling entity.

35. The data signal of claim 33, wherein the instructions when executed cause the system to further:
determine a type of the announcement information; and
launch an application, based on the type, to process the announcement information.

36. The data signal of claim 33, wherein receiving the call request comprises receiving a call request to establish a voice-based call session.

37. The data signal of claim 33, wherein presenting the announcement information comprises displaying one or more images of a calling party.

38. An article comprising at least one storage medium containing instructions that when executed cause a system to:
receive a call request wherein the call request includes a Session Initiation Protocol Invite message, to establish an interactive call session, the call request embedding announcement information having identification information of the calling entity and additional information describing the requested call session, the additional information containing media data;
determine a type of the media data; and
based on the determined type, launch an application to present the media data on an output device of the system.

39. The article of claim 38, wherein presenting the media data comprises displaying one or more images of a calling party.

* * * * *

UNITED STATES PATENT AND TRADEMARK OFFICE
CERTIFICATE OF CORRECTION

PATENT NO. : 6,771,639 B1
DATED : August 3, 2004
INVENTOR(S) : Mark J. Holden

It is certified that error appears in the above-identified patent and that said Letters Patent is hereby corrected as shown below:

Column 11,
Line 28, before "wherein" insert -- , --.

Column 12,
Lines 22 and 48, before "wherein" insert -- , --.

Signed and Sealed this

Fifth Day of October, 2004

JON W. DUDAS
*Director of the United States Patent and Trademark Office*

UNITED STATES PATENT AND TRADEMARK OFFICE
CERTIFICATE OF CORRECTION

PATENT NO.    : 6,771,639 B1
DATED         : August 3, 2004
INVENTOR(S)   : Mark J. Holden It is certified that error appears in the above-identified patent and that said Letters Patent is hereby corrected as shown below:

Column 10,
Line 35, after "request" insert -- , wherein the call request includes a Session Initiation Protocol Invite message, --.

Signed and Sealed this

Tenth Day of May, 2005

JON W. DUDAS
*Director of the United States Patent and Trademark Office*